United States Patent [19]

Baldiga et al.

[11] Patent Number: 5,613,155
[45] Date of Patent: Mar. 18, 1997

[54] BUNDLING CLIENT WRITE REQUESTS IN A SERVER

[75] Inventors: Frank P. Baldiga, Endwell; Christopher Meyer, Vestal, both of N.Y.

[73] Assignee: International Business Machines Corporation, Armonk, N.Y.

[21] Appl. No.: 475,728

[22] Filed: Jun. 7, 1995

[51] Int. Cl.⁶ .................................................. G06F 13/00
[52] U.S. Cl. ..................... 395/825; 395/200.13; 395/439; 395/840; 395/841; 395/427
[58] Field of Search ..................... 395/825–827, 395/840–841, 200.13, 200.14, 200.01, 600, 650, 439, 427

[56] References Cited

U.S. PATENT DOCUMENTS

| | | | |
|---|---|---|---|
| 4,445,176 | 4/1984 | Burk et al. | 364/200 |
| 5,014,195 | 5/1991 | Itoh | 395/455 |
| 5,053,945 | 10/1991 | Whisler | 364/200 |
| 5,124,909 | 6/1992 | Blakely et al. | 395/200 |
| 5,218,695 | 6/1993 | Noveck et al. | 395/600 |
| 5,218,713 | 6/1993 | Hammer et al. | 395/800 |
| 5,224,214 | 6/1993 | Rosich | 395/250 |
| 5,276,840 | 1/1994 | Yu | 395/425 |
| 5,283,883 | 2/1994 | Mishler | 395/425 |
| 5,313,585 | 5/1994 | Jeffries et al. | 395/439 |
| 5,392,398 | 2/1995 | Meyer | 395/200 |
| 5,446,855 | 8/1995 | Dang et al. | 395/401 |
| 5,467,434 | 11/1995 | Hower, Jr. et al. | 395/114 |
| 5,517,660 | 5/1996 | Rosich | 395/800 |

FOREIGN PATENT DOCUMENTS 1-241243  9/1989  Japan ........................ H04L 11/20

OTHER PUBLICATIONS

"Improving Data Migration Performance for a Network Environment", IBM Technical Disclosure Bulletin, D.W. Dewey and R.J. Means, Dec., 1994, vol. 37, No. 12, pp. 23–26.

"The Design and Implementation of a Log–Structured File System", Mendel Rosenblum and John K. Ousterhout, Electrical Engineering and Computer Sciences, Computer Science Division, University of California, Berkeley, CA.

Primary Examiner—Christopher B. Shin
Attorney, Agent, or Firm—Baker, Maxham, Jester & Meador

[57] ABSTRACT

Logic for receiving client write requests, bundling them, and sending a reply back to the client(s) once the requests are committed to storage. The logic is included in an intermediate server which includes a write request module having a write bundling module included and a write reply module. A separate reply is sent for each of the individual client write requests. Out of order requests are handled by checking for a contiguous write having a lower file location (offset) than a current write request and placing that lower ordered offset request first in the bundle.

34 Claims, 12 Drawing Sheets

BUNDLING CLIENT WRITE REQUESTS IN A SERVER

BACKGROUND OF THE INVENTION

1. Field of the Invention

The invention relates generally to optimizing the performance of write operations in a client/server architecture, and particularly to a system and method of enhancing the performance of write requests from a client to a data store on a server disk.

2. Description of the Related Art

Microprocessor technology has evolved to the point where it has become practical to build desktop computers as powerful as earlier mainframe timesharing systems. Individuals can have their own dedicated computers for performing the bulk of their work and they can use communication facilities for transmitting data between such systems and their own computers. Computing is distributed to the sites at which it was needed rather than bringing the data to be processed to some central large scale computer installation such as a mainframe. The key to such distribution has been to transfer information between computers in computer networks. Electronic mail, file transfer, and remote database access applications have proliferated with computer network installations.

Communications in local area networks (LANs) has been made practical and economical by the "Ethernet" standard developed at Xerox Palo Alto Research Center and the "Token ring" standard available from International Business Machines Corp. (IBM). A so-called "client/server" architecture has become widespread on LANs. "Clients" are network users that need various services performed and "servers" are hardware/software network components that perform these services. Typically clients and servers reside on different computers; however, they may exist on the same computer. Many applications exist in which two processes must pass data back and forth over some type of communication transport. Moving data between computers and between processes can cause a large amount of computing overhead. When one of these processes is a "client" computer process and the other related process is a "server" process, more overhead can be incurred by moving the data to different locations in the server's local storage, such as onto a storage disk.

A fundamental component of any computer is its operating system. An operating system is logic, typically software or firmware, that makes the hardware elements of a computer usable. Thus, operation systems are primarily hardware resource managers for resources such as processors storage, input/output devices and communication devices. An important component of an operating system is the "file system". File systems generally contain access mechanisms, file management mechanisms, auxiliary storage management mechanisms, and file integrity mechanisms. A "remote file system" refers to a file system that is on a different "node" than a particular client. That is, computers on a network are referred to as nodes and each node has a unique name. A node may be a server, or client, or both. A server provides services to processors or users on one or more clients. A node issues systems calls and/or commands to the server or client. One approach to handling non-local file references in a computer network is to route all such requests to a "file server", i.e., a computer system dedicated to resolving inter-computer file references. This approach centralizes control of these references, but the file server typically becomes a bottleneck. One approach to overcome the bottleneck problem is to allow separate computers to communicate directly with one another, such as the approach taken in the "network file system (NFS)" architecture developed by Sun Microsystems Inc. In an NFS network, each computer can act as a server and/or a client.

Servers may export file systems to the network and the clients may input these file systems. An NFS server may initiate service by issuing a command to initiate daemons. Daemons are processes that perform their functions automatically when needed, and without interacting with a user. A classic example of a daemon is a system process that swaps processes to secondary storage automatically when it is necessary to lighten the load of main memory.

The NFS system is said to be robust. This is because NFS is based on remote procedure calls (RPC) which is a structural high-level approach to interprocess communication on distributed systems. An RPC allows the process on one system to call a procedure in a process on another system. The RPC transfers information strictly through the parameters in the call. The independent packets of information communicated between clients and servers on such an architecture are referred to as "datagrams", drawing on an analogy to telegrams. Communications are said to be "connection-less" because each packet must carry its full destination address in much the same way that each letter sent through the mail must carry its full destination address independent of every other letter. Because the packets contain the full destination address the server is not responsible for keeping up with client/server connections nor the state of each file sent on the network. Therefore, the failure of a client is transparent to the server. On the other hand, if a server fails the client simply retries its request which is processed upon return of server operation. Thus, the system is robust because of its apparent impunity to failure.

NFS implements file handles to identity a file. A file handle is a unique integer that is returned when a file is opened and is used to identify that file. In NFS version 2 the file handle size is 32 bytes. To read or write (part of) a file a client sends a request specifying the file, i.e., the file handle, the record position for a label referred to as the "offset" and the amount of data to be transferred referred to as the "length". Copying a large file is typically made up of a number of such write requests containing a fixed amount of contiguous data. Contiguous data means that the data resides in adjacent storage locations. Typically a client sends multiple write requests or packets to a server consisting of an amount of data that is significantly less than the maximum amount that can be processed by this server and committed to storage such as a direct access storage device (DASD). For example, an NFS version 2 client is allowed to send a maximum 8 k byte per write request but the server can process up to 64 k bytes at one time.

In order to adhere to the requirements of the connection less protocol, the client must receive an acknowledgement for each one of the multiple requests that indicates that the request has been serviced. Meeting such a protocol requires processor overhead. Thus, there is a tension between the need to adhere to the protocol expected by the client and therefore maintain the robustness of the system, and the desire to exploit the capability of the server to process more data than a client might request in a single write request. If the blocks of data in several write requests could be combined when committing the data to a direct access storage device (DASD), e.g. a hard disk, to decrease server central processor utilization and improve overall throughput while maintaining a robust system then this would clearly be an advancement in the art. Further it would be an advancement in the art to introduce such advantages without greatly increasing overhead at the server processor.

SUMMARY OF THE INVENTION

In accordance with the objectives of this invention as described above and to overcome the limitations of the prior art, this invention provides a system and method for bundling or combining contiguous data contained in multiple write requests that are sent to a server on a local area network. Broadly speaking, the server processes a write request from the client, bundles write requests directed to any contiguous data and sends these bundles to be committed to DASD. Once a bundle of write requests is committed to DASD a reply is sent to the client in accordance with the protocol that the client will accept. A separate reply is sent for each of the individual write requests that were bundled together and committed to DASD. The invention operates as logic in the server by processing the write request, including any bundling, and also handling the write reply to the client.

The foregoing, together with other objectives, features and advantages of this invention, will become more apparent when referred to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENT

This invention is described in a preferred embodiment in the accompanying drawing figures. In these figures, a like number shown in various figures represent the same or similar elements. While this invention is described in terms of the best mode for achieving this invention's objectives, it will be appreciated by those skilled in the art that variations may be accomplished in view of these teachings without deviating from the spirit or scope of the invention. In particular, certain aspects of this invention are described as operating as logic and embodied as computer software in computer memory, but this invention could also be enabled as hardware logic by one skilled in the computer arts in view of these teachings. Further, it should be understood that the term "server" may indicate a complete and separate computer system or it may be simply the part of a computer that owns a resource. Accordingly, one computer system may have more than one "server" included. A client may also be a complete and separate computer system or it may simply be the part of a computer that requests to use a resource owned by the server. Therefore a "client" may exist on the same computer as a server. In a preferred embodiment, one computer may be configured to serve the role of a client at one time and a server at another time.

System Architecture

Figure 1:
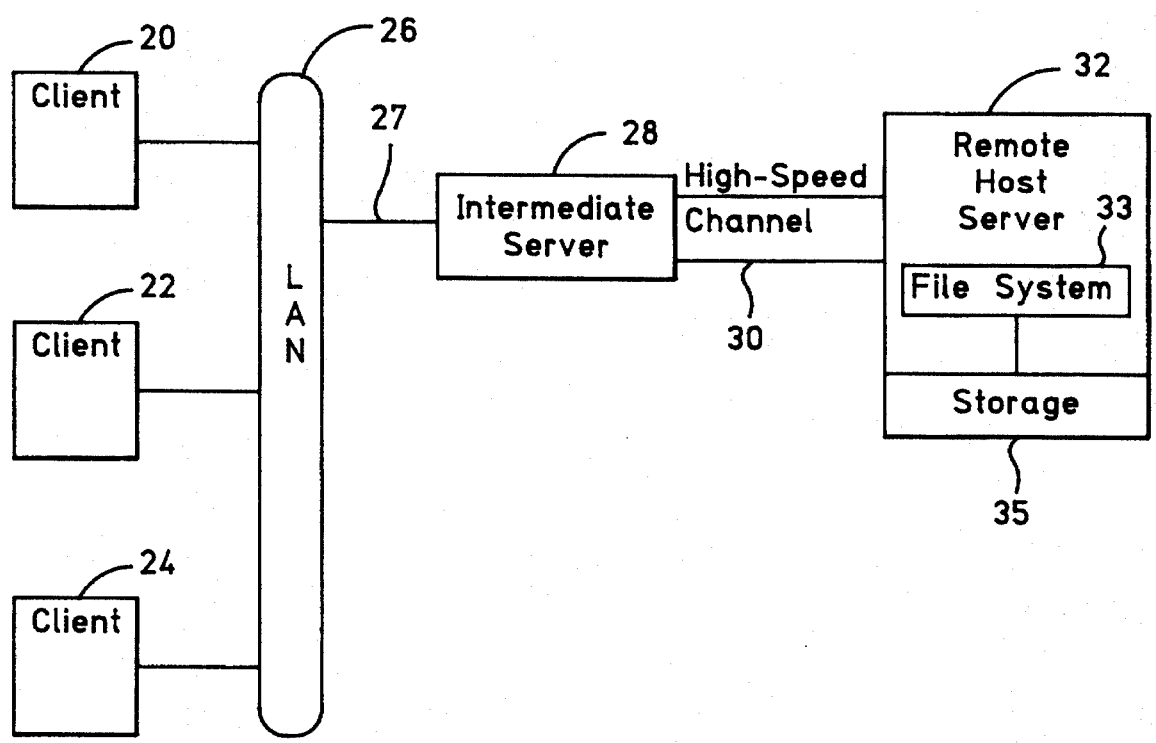
FIG. 1 is a functional block diagram of a distributed data processing system suitable for implementation of the system of this invention.

FIG. 1 shows a preferred environment for the operation of this invention. Each of clients 20, 22 and 24 communicate on communication media 27 on local area network 26 with intermediate server 28 which is in communication through high-speed channel 30 with remote host server 32, preferably obeying connection-less protocols of the NFS architecture which includes remote procedure calls. Reference may be made to H. M. Deitel, *Operating Systems, 2nd Edition* for details regarding NFS and remote procedure calls. The remote host server 32 includes a file system 33 which manages storage 35 which may be, for example, a direct access storage device (DASD) also known as a hard disk. Thus, the file system 33 is viewed as a remote file system to each of the clients 20–24 and the intermediate server 28.

In a preferred embodiment of this invention the LAN may be a token ring at 16 megabits per second communication rate, or it could also be an ethernet LAN. Any of the clients could be a well-known personal computer or a mainframe such as an IBM 3090. The intermediate server could be a well-known personal computer such as an IBM PS/2 or a workstation provided by a vendor such as Sun Microsystems, or even an integrated communications adapter. The high-speed channel could also be a LAN or a parallel channel operating at a high speed of about 3.5 megabytes per second. The remote host server in a preferred embodiment is a mainframe, such as the IBM 3090, but could also be a personal computer or workstation. Although the intermediate server is shown separate from the remote host server it should be understood that the intermediate server could in fact be part of the remote host server. However, particular advantages are provided by the illustrated embodiment of this invention. For example, the intermediate server is in communication with clients over a LAN that may not be capable of transmitting data at a rate as high as the high-speed channel can, such as the illustrated embodiment shown in FIG. 1. Another advantage of an intermediate server separate from the remote host server is that workload for the remote host server is off-loaded by the intermediate server which can preprocess RPC's through well-known caching operations and through bundling operations that will be described below. It should also be understood that the client could also reside in the same computer as the intermediate server.

In a preferred embodiment the client server architecture communicates according to the well-known network file system (NFS) protocol developed by Sun Microsystems which is based on the TCP/IP communication standard developed by the Department of Defense. NFS is preferred because it conforms to Sun's network services architecture which enables different computers and operating systems to share a common network and because of its robustness. This invention provides particular advantages for a robust system such as NFS. In a preferred embodiment, the invention utilizes some mechanisms made available by NFS, such as remote procedure calls (RPC) for inter-process and inter-server communications.

Figure 2:
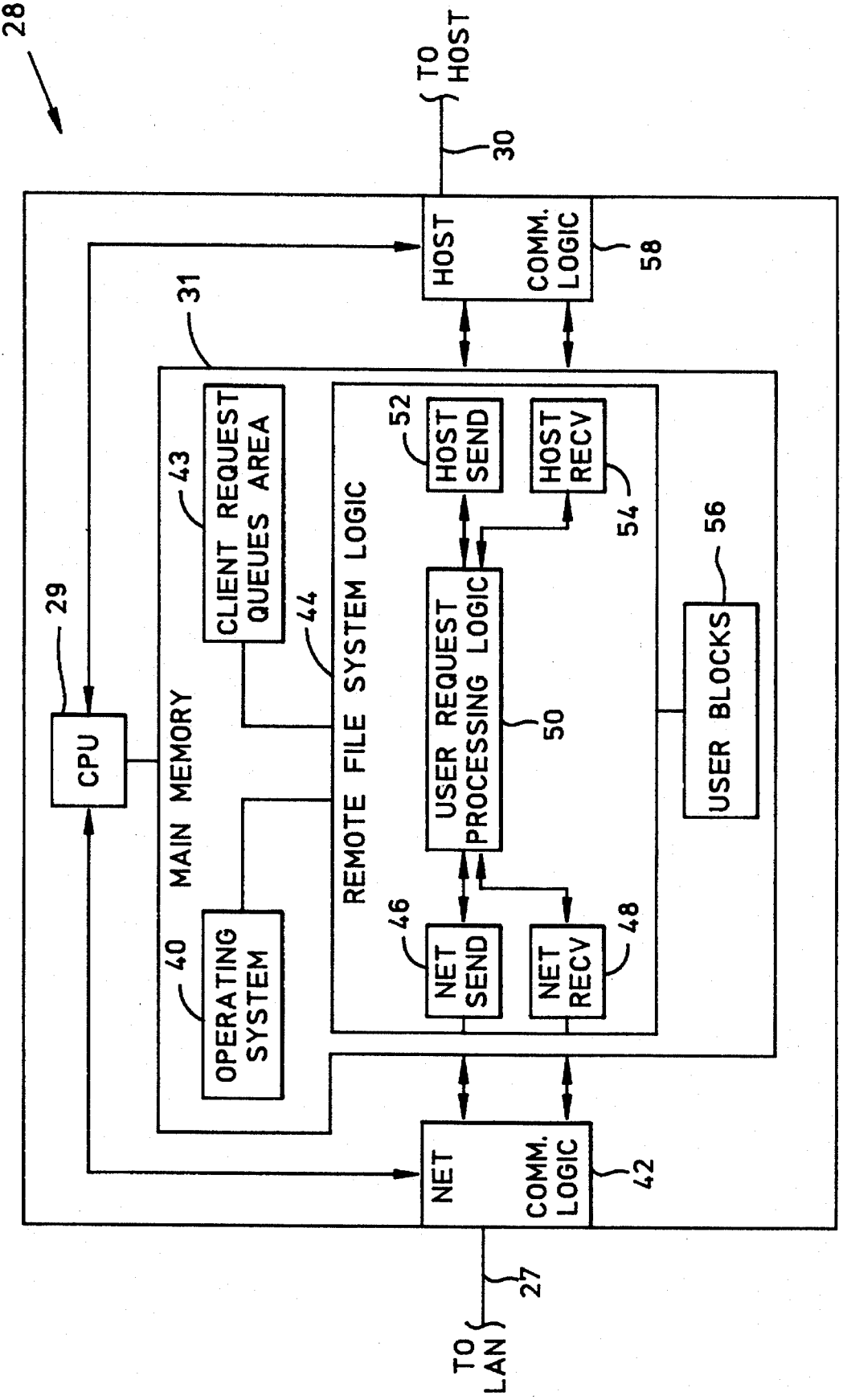
FIG. 2 is a functional block diagram of the architecture of the logic of this invention employed in the data processing system of FIG. 1.

Referring to FIG. 2, the intermediate server 28 includes a central processing unit 29 and main memory 31 which are each coupled to host communication logic 58 including hardware and firmware for communicating with remote host server 32. CPU 29 and main memory 31 are further coupled to net communication logic 42 which includes both hardware and firmware that communicates according to the TCP/IP protocol to clients across LAN media 27. Net communication logic 42 may be a well-known IBM token ring an ethernet adapter providing communications through well-known mechanisms such as device drivers and protocol stacks. Host communication logic 58 may be a well-known IBM communications adapter providing communication with an IBM 3090. CPU 29 may be an IBM Disc processor or an Intel processor. Main memory 31 may include random access memory (RAM).

Main memory 31 includes operating system 40 for managing the resources on the intermediate server 28. Although not shown, the host server 32 also includes an operating system. Operating system 40 in a preferred embodiment is the well-known IBM OS/2 operating system. Remote file system logic 44 is in direct communication with operating system 40 and may be a component of the operating system or may exist independently. Remote file system logic 44 communicates with file system logic 33 on remote host server 32 (FIG. 1) for managing the storage resource 35 on that server. The remote file system logic preferably is implemented in software; however, it will be understood by those skilled in the art that hardware elements could be substituted for the software elements in view of the teachings of this specification. Remote file system logic 44 includes net send module 46 and net receive module 48. Each of these network communications modules are in direct communication with device drivers included in network communication logic 42.

Operating systems such as IBM's OS/2 and UNIX allow for the simultaneous presence of many "threads" of execution in an application. The path of execution of a processor through the instructions of a program is called a "thread of execution". Servers running under such operating systems are said to be "multi-threaded" meaning that they can process multiple requests concurrently. Thus, such applications are said to be multi-threaded. In OS/2, processes own resources, e.g., memory, files, and queues. Every thread within a process shares all that processes resources. Threads provide a convenient way to handle portions of a job that are most naturally handled asynchronously. Since all threads of a process have access to all the resources of that process it is possible for several threads, for example, to issue reads and writes to the same file using the same file handle. Thus, threads generally behave as sub-processes. In a preferred embodiment the net send module 46 and the net receive module 48 are implemented as threads which are owned by processes implemented by the remote file system logic 44.

Referring again to FIG. 2, host send module 52 and host receive module 54 are in direct communication with host communication logic 58 and are preferably implemented as threads owned by remote file system logic processes. Each of the communication modules 46–54 are in communication with user request processing 50.

User request processing logic 50 is preferably software that operates in response to requests from clients sent over the LAN by the code in the client. These requests are received by the net receive module and associated replies are sent by the net send module. The user request processing logic manages another area of main memory referred to as user blocks 56. User blocks 56 refers to a table containing a plurality of user control blocks, such that there is one control block for each user on the network. Regarding terminology, a user equates to an identified entity, typically having a user ID that generates requests on a client computer. Although a user does not typically equate explicitly to a client, the typical case is that there is only one user supported or logged onto a client computer at a particular time. For this reason processing a write request initiated by a user logged onto a client is referred to as a "client write request" in this specification.

Figure 3:
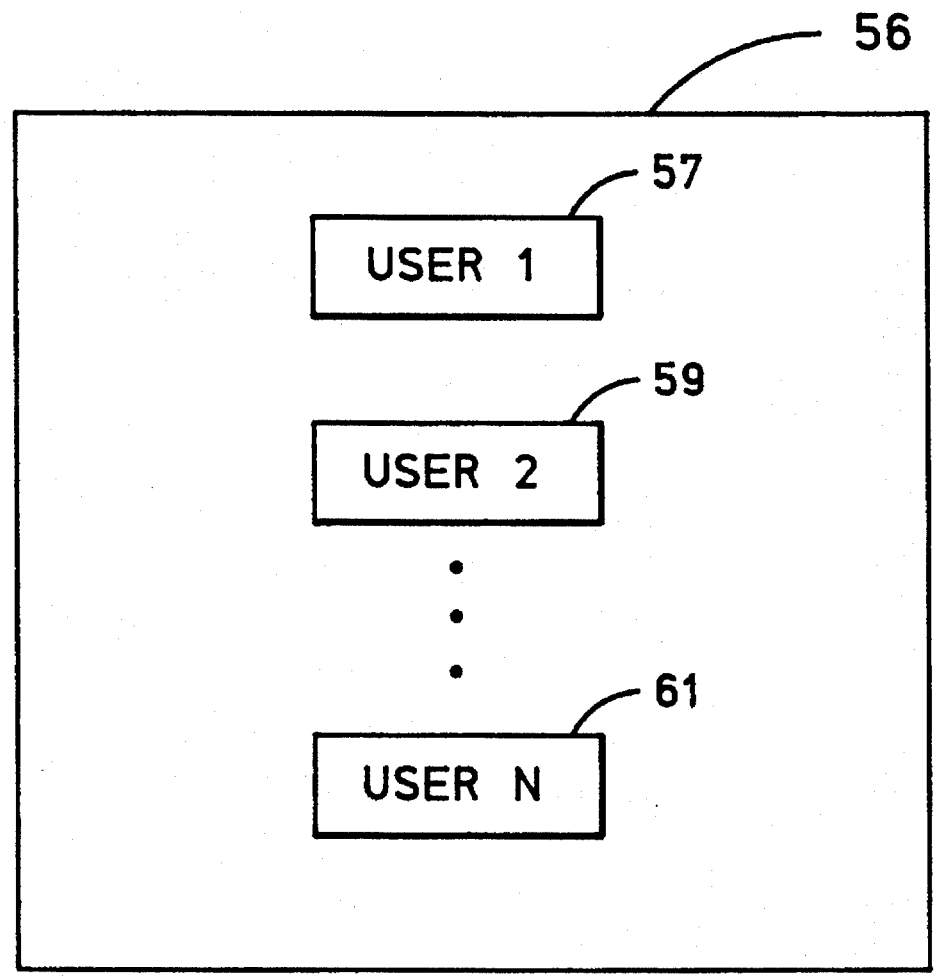
FIG. 3 shows a simplified overview of user blocks shown in FIG. 2.

FIG. 3 shows exemplary user blocks 56. User blocks 56 include user 1 control block 57, user 2 control block 59 through user N control block 61. Each user control block, such as user 1 control block 57, contains state information, information related to a reply cache (not shown), and a pointer to a list of a client request queues area 43 in memory 31. The queue 43 includes pending requests for each user on a client system in a separate queue. Regarding nomenclature, a "client write request queue" is used in this specification as a shorthand reference for such requests queued or pending for a particular user ID in queue 43. It is the net receive module 48 that puts requests in their proper place in the queue. The user blocks 56 is best implemented as a linked list of free blocks and in-use blocks that may be indexed by address and user ID for lookup purposes. A table format may be one embodiment of user blocks 56; however, it may also be thought of as a stack of user control blocks to be processed by server 28.

Figure 4:
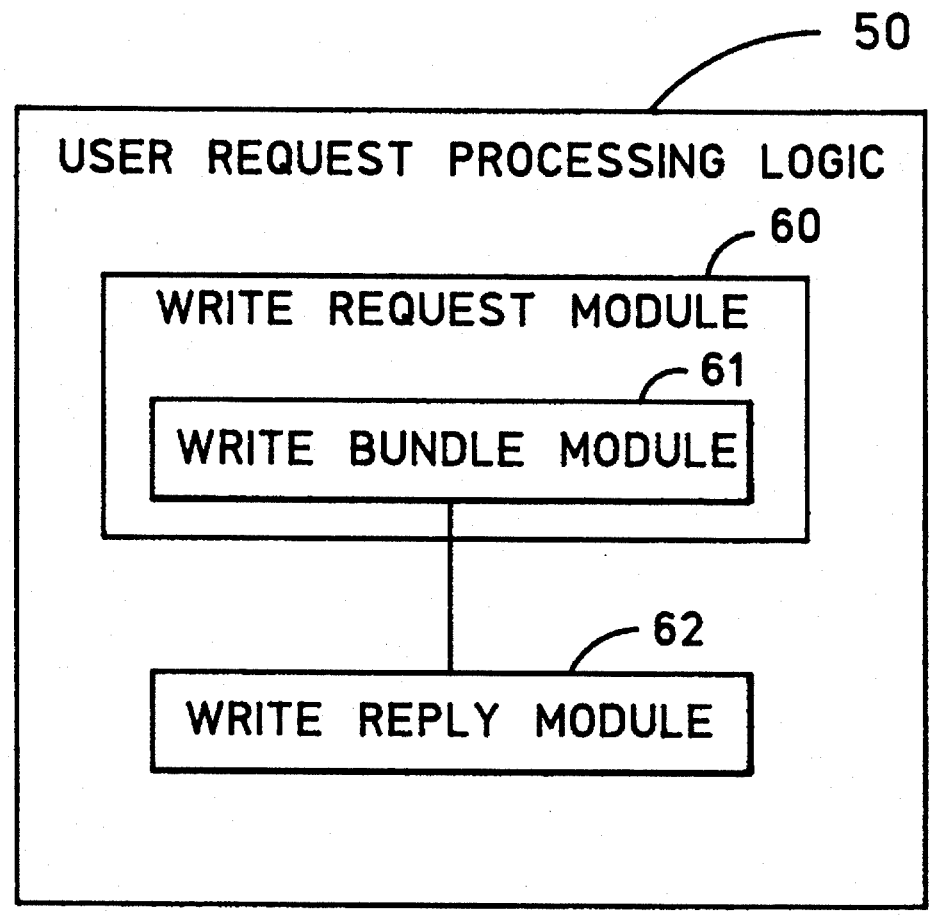
FIG. 4 is a diagram illustrating a simplified overview of the operation of the user request processing logic shown in FIG. 2.

Referring to FIG. 4, user request processing logic 50 includes a write request module 60 which further includes a write bundle module 61 which operates in accordance with the operation of this invention as described below with reference to the flow diagram FIGS. 7–12. User request processing logic 50 also includes a write reply module 62. The write request module 60 processes a write request from the client which is received from the net receive module 48. If certain conditions, described below, are met then two or more write requests are bundled by the write bundle module 61 and the results of the bundled request are sent to remote server 32 (FIG. 1). The write reply module 62 processes the response to the bundled write request by sending a separate and unique response to the client for each original write request that was bundled. Thus, the bundling process is transparent to the client.

The write request module 60 and the write reply module 62 enable the operation of this invention. Referring to FIG. 1, a high level overview of their interaction is that the intermediate server 28 processes one or more write requests from a client such as client 20 on the LAN 26 and bundles contiguous write data and sends it in a single write request to remote server 32. Write requests that are out-of order or which do not arrive in the same order in which they are sent to the intermediate server must be handled. The remote server 32 receives the bundled requests in one receive operation and writes the data in a bundled write request out to storage 35. If the intermediate server is the same as the remote server then instead of sending the bundled data to the remote server the bundled data would be written out to storage belonging to that server.

The benefit of write bundling enabled by this invention is increased write throughput and decreased remote host server CPU utilization when copying a large file from a client's local disk to the remote server disk. By bundling multiple buffers of contiguous data in the intermediate server and sending them to the remote server in one operation, the remote server is able to receive and commit one large buffer as opposed to handling each unbundled write request separately.

Figure 5:
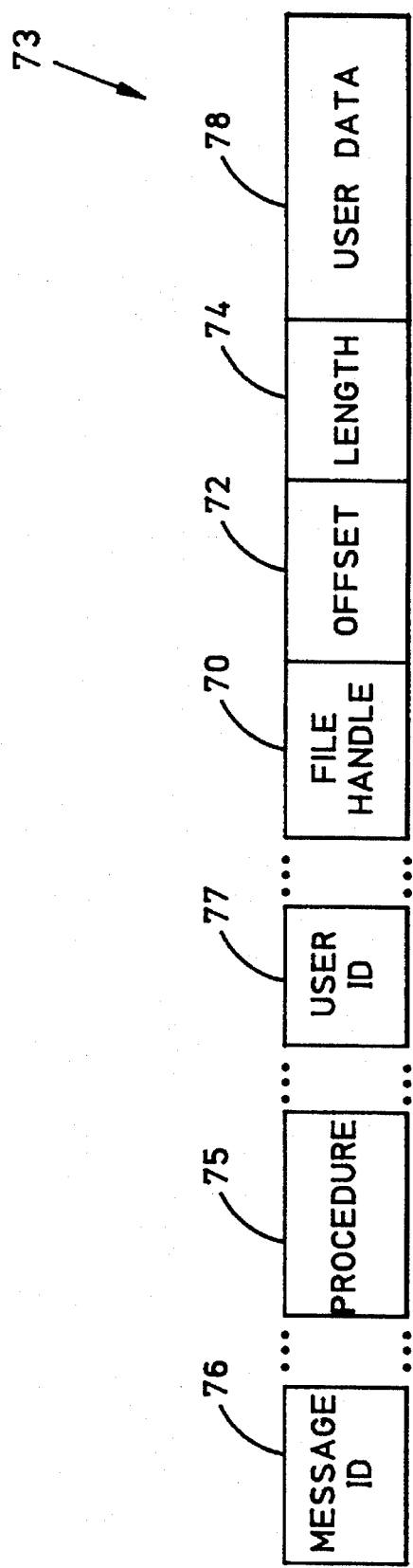
FIG. 5 shows a data structure of a write request issued by a client shown in FIG. 1 and transmitted to a server also shown in FIG. 1 and in FIG. 2.

Referring to FIG. 5, a portion of a block of data records for a write request data structure 73 is shown. A procedure indicator 75 indicates the type of client request, such as a read or write. A user ID field 77 indicates the particular user for whom the request is being made. The write request data structure in a preferred embodiment includes a file handle 70 which includes enough information for the remote server to locate the file in storage 35 of remote server 32. Thus the file handle 70 gives the location of the file of interest. Offset record 72 includes the offset within that particular file where the data to be written is located. Length record 74 tells the intermediate server how much data is to be written, relative to the offset. The message ID 76 is constructed by the client in order to keep up with its own sequencing of messages. The user data record 78 includes up to the maximum amount of data that a client may send on LAN 26 (FIG. 1) at any one time, according to the particular protocol being implemented, which is typically less than the amount that can be handled by the remote host server. For example, the client may send multiple 8 k requests according to an NFS version 2 protocol. In such a situation, the intermediate server may be capable of taking advantage of the high-speed channel and sending up to 64 k to the remote host server at one time. This is one particular example of the advantages of the write bundling enabled by this invention.

Figure 6:
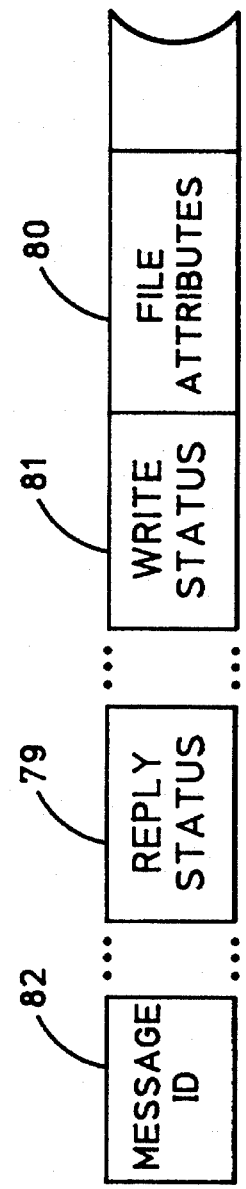
FIG. 6 shows a data structure of a write reply created by the server depicted in FIG. 2 in response to the write request of FIG. 5.

In general, as mentioned above, the server must handle the condition when write requests are sent or received out of order. This can be recognized where the first write request has an offset field 72 (FIG. 5) which is greater than any of those which are queued in memory 31 by the user request processing logic 50. For example, in an NFS environment which uses a user datagram protocol, i.e. a connection-less protocol, this may readily happen since data packets can get lost or delayed. Another typical cause leading to such a situation is the use of block I/O daemons which are all running in parallel. Thus, for example, if client 22 issues a write request for a large block of data, the actual order in which each 8 k data block is written is not synchronous. As will be described in more detail below, the remote file system logic 44 checks the queue for any request that has an of offset less than the starting write request, but which is still contiguous to that write request. If this condition happens, this request is marked as the new initial starting point and its offset record 72 is used as the base. Write bundling is started using that new write request as the first request in the bundle. FIG. 6 shows the data structure of the block returned as a write reply once the bundling process has taken place. The overall structure is preferably not changed from that which adheres to an NFS protocol; however, the "file attributes" record 80 is modified to reflect the size of the write request before a bundling operation occurs. In accordance with the protocol expected by the client the file size returned by the write reply module 62 corresponds to the size of the request sent by the client and not the size of the entire bundled file. The message ID in the "message ID" field 82 corresponds to the one in field 76 of the write request data structure so that the client can match the reply to the request. A write status field 81 indicates if the write was successful. In order for the write to have been successful the entire bundled write must have been successful in accordance with the protocols of this invention. However, the write status is propagated to the client for each bundled write request making it transparent to the client. A reply status field 79 gives additional status information regarding the write request.

Referring to FIGS. 7–12, the operation of this invention is described in more detail to describe the operation of the remote file system logic 44 with all of the other elements shown in immediate server 28 and also with respect to the distributed data processing system shown in FIG. 1.

Figure 7:
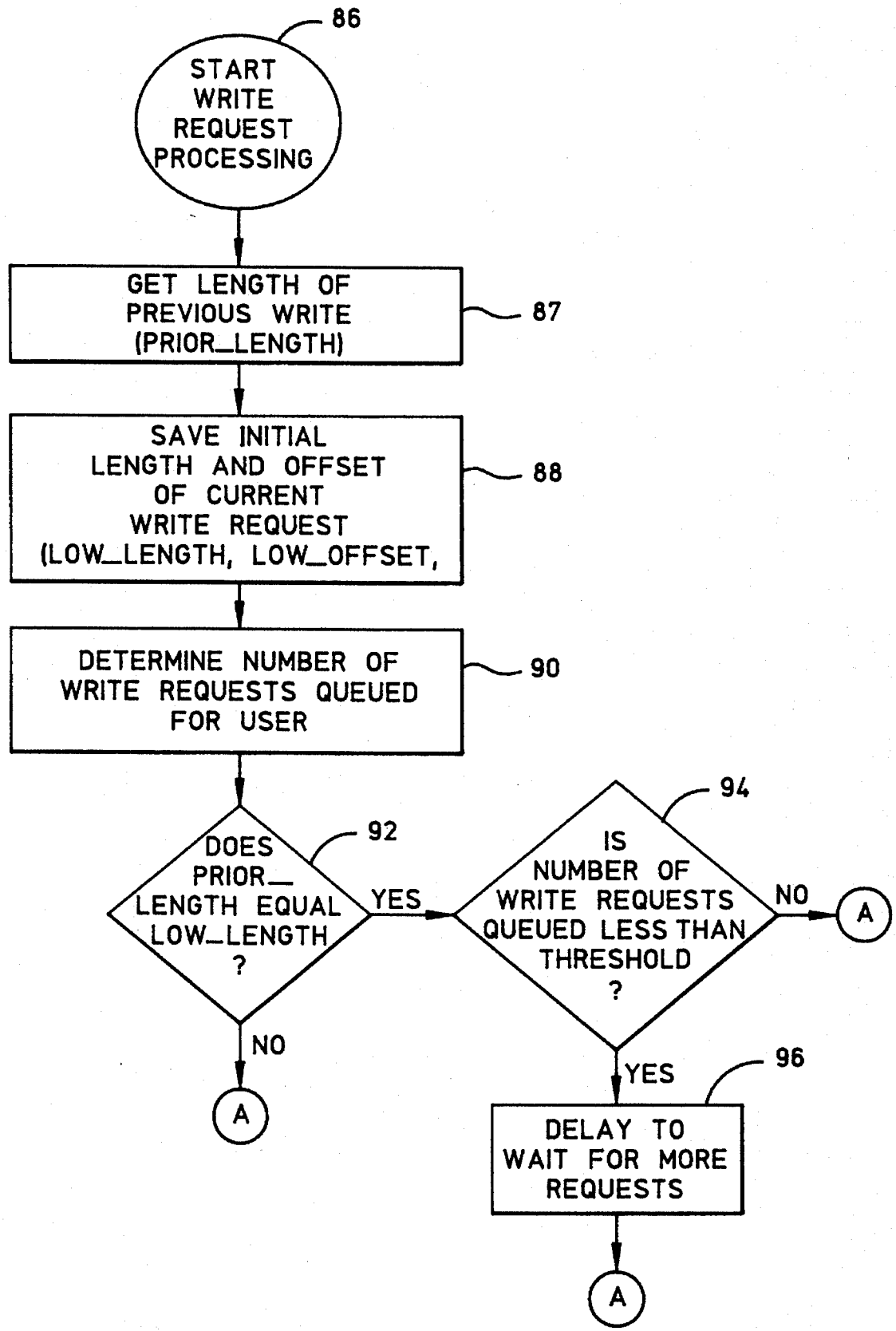
FIGS. 7, 8, 9, 10, 11 and 12 are each separate flow diagrams showing the operation of the invention.
Figure 8:
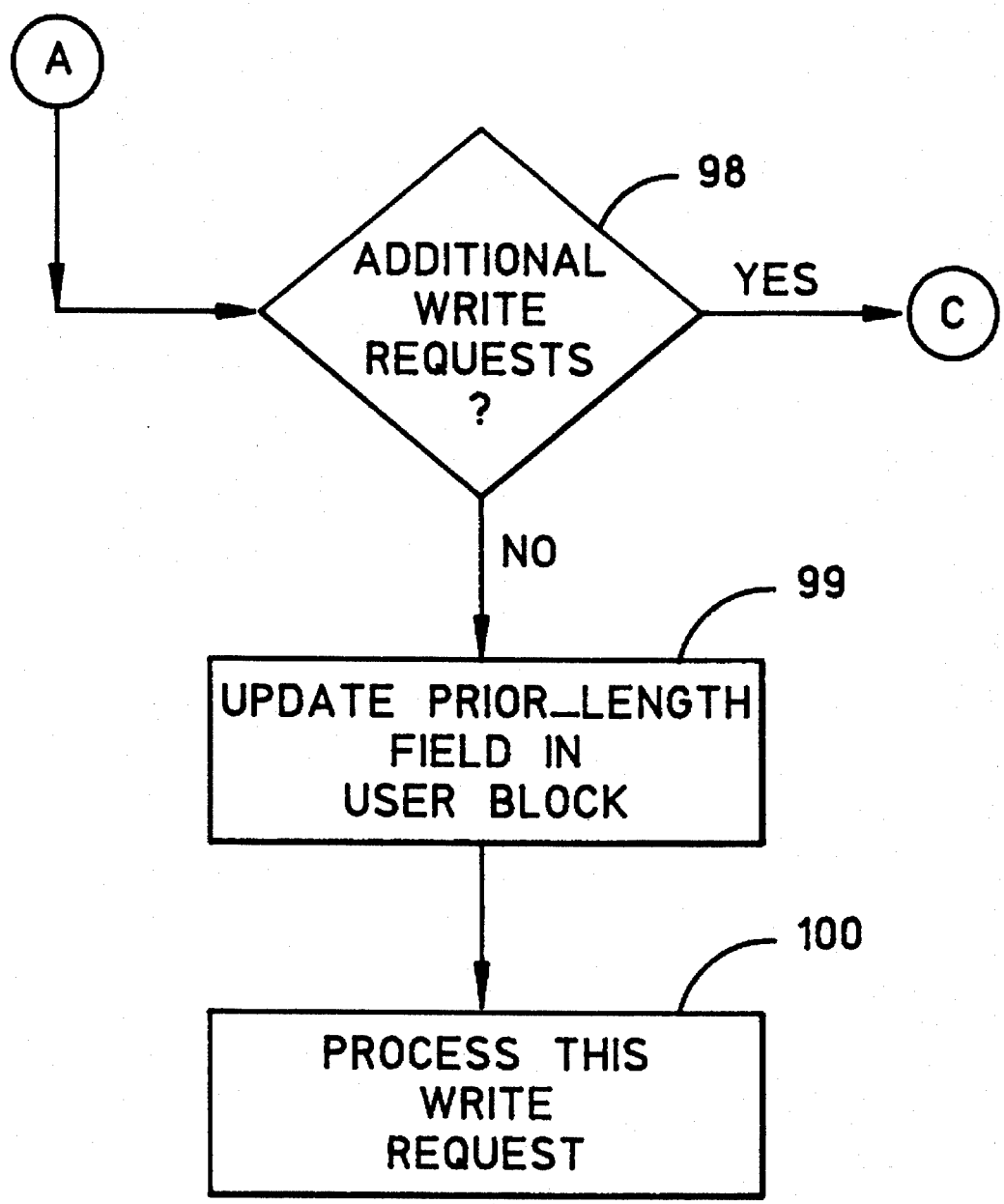

FIGS. 7 and 8 show the flow of processing a write request in which the server 28 waits for any additional write requests to arrive from a client if it appears to the server that more requests are coming in. The test for determining if any more contiguous requests are coming in is described below. Write request processing begins in step 86 (FIG. 7). In step 87, the length of a write request which has already been saved in memory 31 in the user block by logic 50 is retrieved, and this length is denoted as PRIOR_LENGTH. The sole purpose of PRIOR_LENGTH is to compare to the next write request which will be denoted as the current write request. The current write request is processed in a bundled write and this process will be described below. In step 88, user request processing logic 50 through write request module 60 saves the initial length and offset of the current write request in memory 31. The length and the offset are determined by using the write request data structure 73 (FIG. 5). The initial length of the current write request is saved in the variable field LOW_LENGTH and the offset of the current write request is stored in the variable LOW_OFFSET. The prior length is saved in the variable PRIOR_LENGTH. In step 90 the logic 50, through use of module 60, determines the number of write requests queued for this particular user by checking the client write request queue for this user in the queues area 43 (FIG. 3).

Referring again to FIGS. 7 and 8, in step 92 a comparison is made to determine if the PRIOR_LENGTH variable equals the LOW_LENGTH variable. If not, processing flows to step A, and in FIG. 8 step 98 is a check to see if there are additional write requests. If there are not additional write requests, then in step 99 a PRIOR_LENGTH variable is updated for any future bundling writes and the single write request is processed in step 100. However, in step 98, if it is determined that there are additional write requests processing continues to continuation step C which connects to FIG. 9 and flows into step 102, which will be discussed below. If the answer to the inquiry in step 92 is "yes", then the length of the previous write request (PRIOR_LENGTH) for this user matches LOW_LENGTH, and another test is performed in step 94 to determine if the number of queued writes is less than a predetermined threshold value. If the answer to this question is "no" then processing flows again into continuation step A and then into step 98 (shown in FIG. 8) and the steps described above are repeated through step 100 where processing ends. If the answer to the interrogatory in step 94 is "yes" then write request module 60 causes a delay to wait for more requests as shown in step 96 which flows into continuation step A. A good choice for a delay time is five milliseconds. The particular predetermined data characteristic criterion implemented to determine whether to wait can use a data characteristics criterion other than the length of the current and prior requests to determine if the server should wait for additional write requests to arrive. Another good choice for such a data characteristic criterion is to compare the offsets of the files to determine if they are contiguous.

Figure 9:
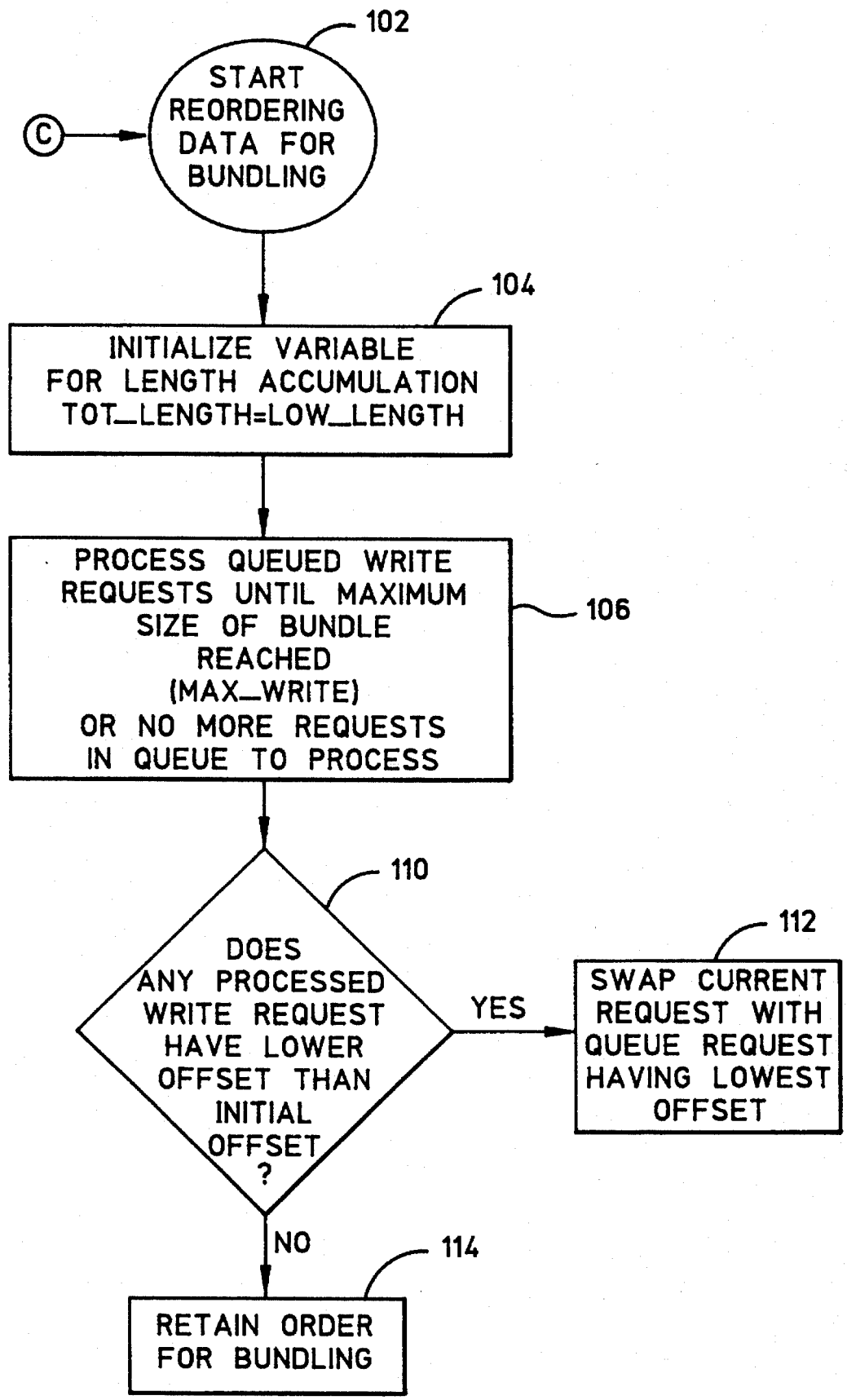

FIG. 9 shows the process of reordering the data for bundling if necessary. The process begins in step 102. In step 104 a variable which is used for keeping track of the accumulated length of data is initialized. Thus, in step 104 the variable TOT_LENGTH is set equal to LOW_LENGTH wherein LOW_LENGTH is the initial length of the current request. The objective of the reordering process shown in FIG. 9 is to allow write request module 60 and write bundling module 61 to check for any write requests that have an offset that is less than the current request but still meet the condition of being contiguous, i.e. to check for out-of-order requests. The logic checks for a write request with a sequential offset lower than the current write request so that the greatest number of requests can be bundled at one time. If such a request is found the logic swaps the current request with the queued request having the lowest offset. The initial request is always included as part of the bundle. This ensures that all requests are processed in a timely manner. It should be noted that sorting can be used, for example, to officially reorder the request; however, the described method has been found by empirical means to be a good choice for ordering for bundling.

In step 106 queued write requests are processed until the maximum size of a bundle is reached or no more requests remain in the queue to process, wherein the maximum size of a bundle is defined by the MAX_WRITE variable which defines the number of blocks that can be sent and the MAX_AMT variable which defines the maximum size of the bundle. Step 106 is essentially enabled preferably as software as shown in the code in Table 1 below.

new offset. If this is true then the request is contiguous. Next a check is made to determine if the maximum amount of data has been reached. The variable MAX_AMT refers to the maximum amount. For example, the maximum amount may be 64 k in which case 8 MAX_WRITE blocks would be correspondingly reached when the 64 k value of MAX_AMT was reached if 8 k data blocks were sent in write requests from the client. However, it should be noted that the determination of MAX_WRITE and MAX_AMT may not always be so directly mathematically proportional because the value of each depends on the particular protocols of the system. If TOT_LENGTH plus NEW_LENGTH is less than equal to MAX_AMT then the following actions occur. A pointer to this request is saved in a variable field defined as LOW_REQUEST and NEW_OFFSET is set equal to LOW_OFFSET. The searching continues from the beginning of the queue for a request having a lower offset than LOW_OFFSET. The TOT_LENGTH variable is incremented by the NEW_LENGTH variable and the DO WHILE loop begins again in the client write request queue.

Referring again to FIG. 9, in step 110, if any processed write request has a lower offset than the initial offset and is contiguous, then in step 112 the current request is swapped with the queued request having the lowest offset value. If such a condition does not exist, as determined by the inquiry of step 110, then the initial order is retained for bundling in step 114. Thus, the LOW_REQUEST variable is used to swap with the current request if it has a lower sequential offset than the current request and is contiguous. The reordered write requests are now ready to be bundled.

TABLE 1

```
AMT_BUNDLED = 0
DO WHILE queued request and AMT_BUNDLED is less than MAX_WRITE
  - Get pointer to queued write request and validate the request.
  IF request is valid
    - Get offset and length of this request and store in
      NEW_OFFSET and NEW_LENGTH
    IF LOW_OFFSET − NEW_LENGTH = NEW_OFFSET /* Contiguous */
      IF TOT_LENGTH + NEW_LENGTH <= MAX_AMT /* Max data */
        - AMT_BUNDLED ++
        - Save pointer to this request in LOW_REQUEST
        - LOW_OFFSET = NEW_OFFSET
        - TOT_LENGTH += NEW_LENGTH
        - Go back to beginning of request queue and start again
      Else quit loop
    ELSE Go to next request in queue
  ELSE Go to next request in queue
END DO WHILE
```

In Table 1, following an initialization of an amount bundled variable, AMT_BUNDLED, a DO WHILE loop is performed while a queued request exists and the number of bundle requests is less than the MAX_WRITE variable. MAX_WRITE is a fixed number indicating the maximum number of blocks that can be bundled together and sent to the remove host server. A good choice for MAX_WRITE, for example, is 8 when dealing with 8 k blocks. A pointer to the request in the queue is used for processing the requests through the DO WHILE loop. Queued write requests are processed until there are no more to process or the MAX_WRITE limit is reached.

Figure 10:
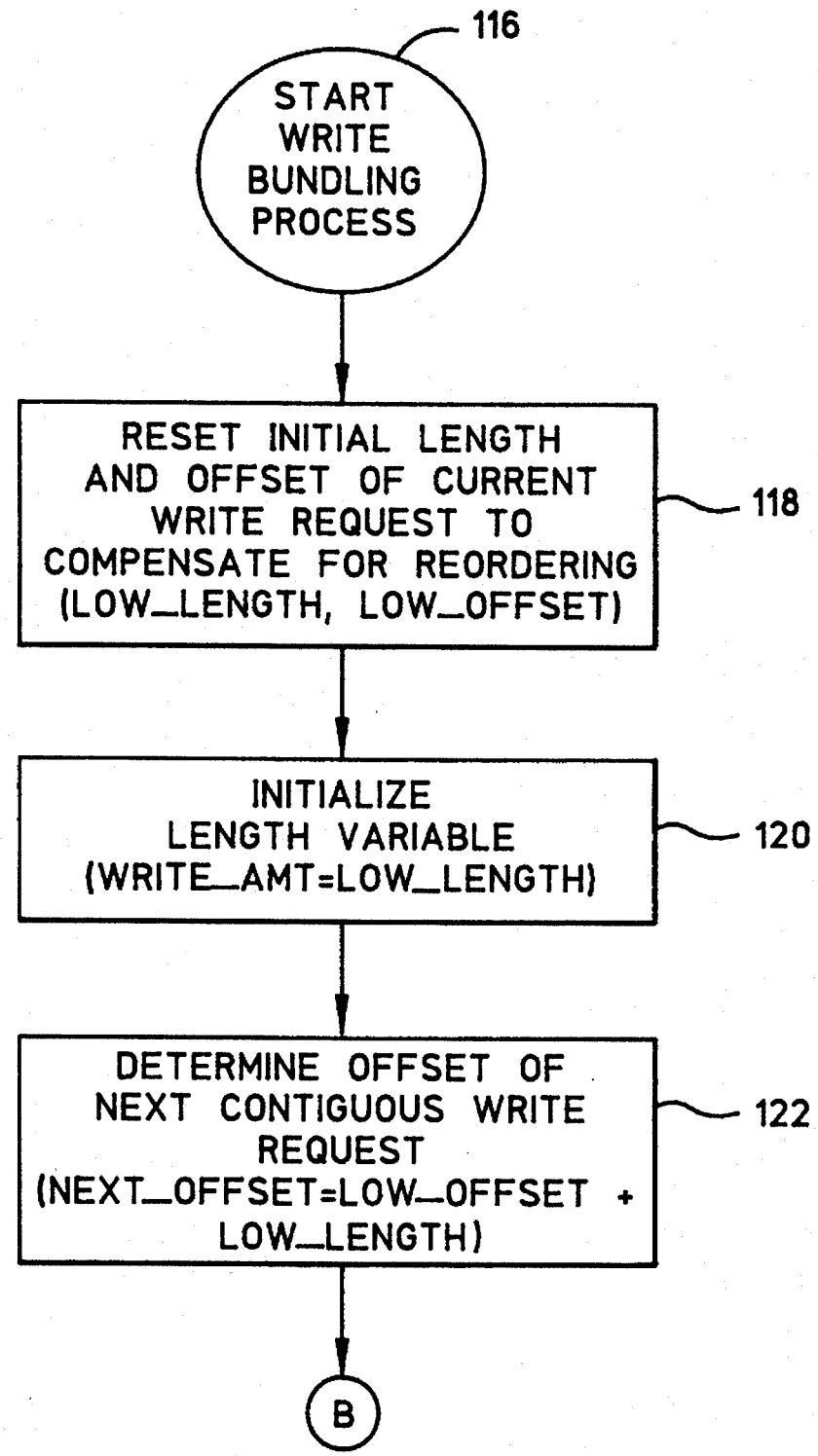
Figure 11:
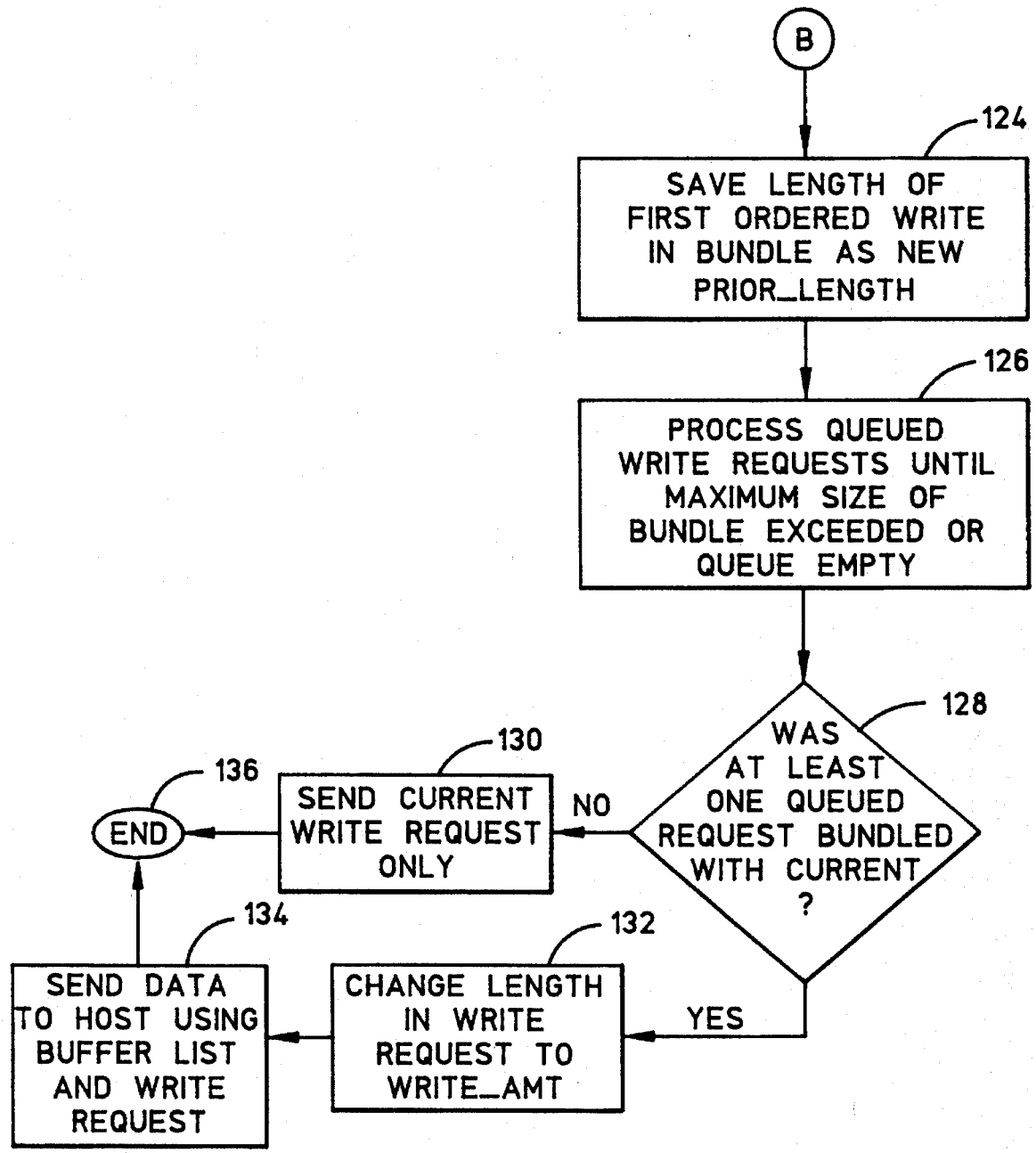

Once it is determined that a write request is valid the offset and the length of the request is stored in the variable NEW_OFFSET and NEW_LENGTH. A check is made to determine if the request is contiguous by subtracting the recently obtained NEW_LENGTH variable from the LOW_OFFSET variable to determine if this equates to the FIGS. 10 and 11 show the write bundling process in which the client write request queue is checked and if a contiguous write request is found it is bundled with the original write request so that they can be sent to remote host server 32 together. In step 116 the write bundling process begins. In step 118 the initial length and offset of current write requests are reset to compensate for reordering. These are saved in the variables LOW_LENGTH and LOW_OFFSET. In order to keep up with how much data is being bundled, in step 120 the length variable is initialized. Thus, the variable WRITE_AMT is set equal to LOW_LENGTH. In step 122, write bundling module 61 determines where the offset of the next contiguous write should start. Accordingly, the variable NEXT_OFFSET is set equal to LOW_OFFSET plus LOW_LENGTH. The length of this write request is saved in the user blocks 56 in step 124 (FIG. 11) as the new PRIOR_LENGTH to be used for future bundling. All queued write requests are processed in step 126 until the maximum size of a bundle allowed is exceeded or all write requests have been processed. This preferably is embodied as software and is shown in pseudocode shown in Table 2 below.

TABLE 2

```
DO WHILE queued request exists and AMT_BUNDLED is less than MAX_WRITE
    Get pointer to queued write request and validate the request.
    IF request is valid
        - Get offset and length of queued write request and store in
          NEW_OFFSET and NEW_LENGTH
        IF WRITE_AMT + NEW_LENGTH > MAX_AMT
        quit loop
        IF NEXT_OFFSET = NEW_OFFSET /* Yes, it's contiguous */
            - AMT_BUNDLED++
            - Remove element from queue and free its storage.
            - Fill in send buffer array with pointer and length
            of the data contained in the write request.
            - Save address of this request in an array (WRITE_REQS)
            so that the buffer can be reused to process the reply to
            the client.
            - WRITE_AMT += NEW_LENGTH
            - NEXT_OFFSET = NEXT_OFFSET + NEW_LENGTH
            - Go back to top of queue and start over
        END
    END
    - Get next request in queue.
END DO WHILE
```

Table 2 which describes the actions of step 126 of FIG. 11 is a DO WHILE loop that processes as long as queued requests exist and the amount bundled is less than the MAX_WRITE variable. This ensures that bundling does not exceed the maximum amount of requests that are allowed to be bundled. The pointer is obtained for the queued write request and the request is validated. Various checks are preferably performed to ensure that a write request is valid. Such checks should including comparing the file handle and user ID fields of the current and queued request and checking to determine if the write length is in range, and also checking other header fields for errors. If so, the offset and length of the queued write request are obtained and stored in the variables NEW_OFFSET and NEW_LENGTH. Next if the WRITE_AMT variable originally initialized to the LOW_LENGTH amount is added to the NEW_LENGTH amount this must not exceed the MAX_AMT, where a MAX_AMT corresponds to that which was described with reference to FIG. 9 above. If WRITE_AMT plus NEW_LENGTH exceeds MAX_AMT then the DO WHILE loop is ended and no more requests are added to the bundle. If NEXT_OFFSET equals NEW_OFFSET then the amount bundled counter is incremented by 1. The write request is removed from the queue and its storage is freed. A buffer array stored in a buffer array area in user blocks 56 and of memory 31 (FIG. 2) is filled in with a pointer and length of the data contained in this write request. The address of this write request is saved in another array, also in buffer arrays area 43 of memory 31 and denoted as WRITE_REQS, so that the buffer can be reused to process the reply to the client, and the contents of this buffer are sent through the net send module 46. Next the WRITE_AMT is incremented by the new length. The NEXT_OFFSET variable is set to the old next offset amount plus the new length. The pointer is set to the top request in the queue and the DO WHILE loop is started over at that point. Finally, processing ends when there are no more requests in the queue or the amount has been exceeded.

Referring again to FIG. 11, an inquiry is posed in step 128 to determine if at least one queued request was bundled with the current write request. If the answer is "no" then in step 130 only the current write request is sent. Processing ends in step 136. However, if the answer to the inquiry in step 128 is "yes" then in step 132 the length of the write request is set to the variable WRITE_AMT (e.g. 64 k) and a remote procedure call is issued to call the write reply module 62 to send the bundled data to the host using the buffer list and the write request as modified in step 132. The send step is shown in step 134. The first element pointed to in the buffer list is the header having the new WRITE_AMT value and the first block of data. The next elements pointed to in the buffer are simply remaining data blocks in the bundle. Again, at the end of step 134 processing of the bundling process ends in step 136.

Figure 12:
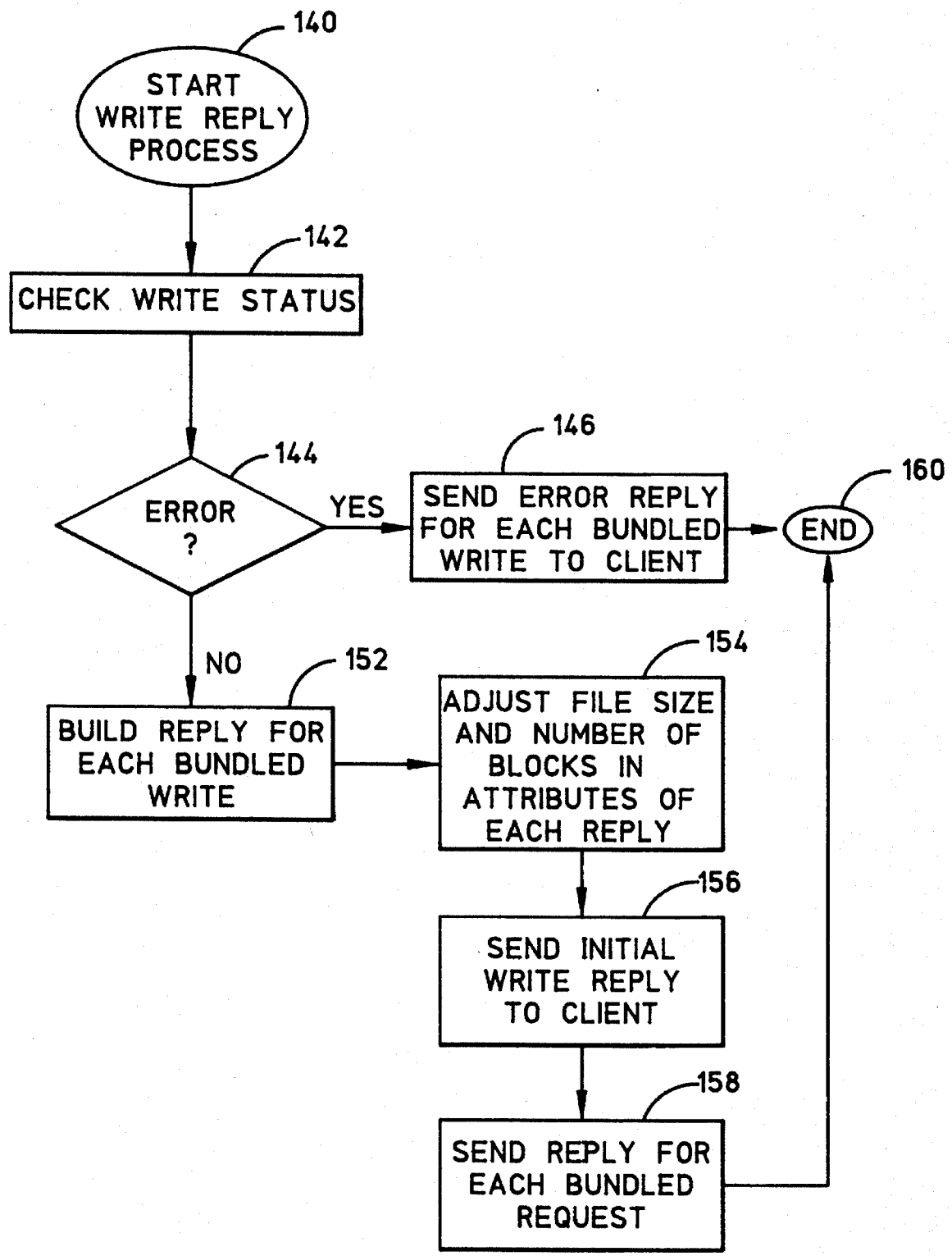

FIG. 12 shows the write reply process which begins in step 140. The write reply process is carried out by the write reply module 62 as shown in FIG. 4. Generally, in this process, the intermediate server 28 processes the response from the remote server 32 for the bundled write. The intermediate server must send a separate response for each original write request that has been originally received from the client. In accordance with the expected protocol, the client must receive the same number of responses as requests. Therefore, if a bundle write is marked as failed in the write status field of the write reply data structure, an error response is sent back to the client for each write request in the bundle. The original request buffers that were saved in the previous stage (i.e., the write bundling stage) can then be used to build each separate response. The write reply module must make sure that each unique response field such as the message ID and file attributes are set to correct values. Accordingly, in step 142 the write status field 81 (FIG. 6) is checked to determine if an error occurred and this inquiry is posed in step 144. If the bundled write requests failed the response will indicate an error. This error response is copied to the allocated write request buffer and filled in by the net receive module 48. Thus, the error is reported to the client in step 146, for each bundled write request, if the answer to the inquiry is "yes" and processing ends in step 160. The handling of an error condition according to this process is shown below in Table 3.

TABLE 3

```
IF reply indicates an error occurred.
  Send the reply to client
  FOR each bundled request (AMT_BUNDLED)
    - copy reply information to buffer containing original request
       (WRITE_REQS array.i).
    - send this reply to client
  END
  - Return
END
```

If the write status field 81 indicates the write was not successful, then an error reply must be sent to the client. The error reply must include the message 10 corresponding to the request. For each separate request included in the bundled request, the reply information is copied to the RPC allocated buffer containing the original request, i.e. the corresponding element of the array WRITE_REQS stored in memory 31. This reply is sent to the client by using the net send module 46.

Generally, if the answer to the inquiry in step 144 is "no" then the request was successfully processed by the remote server. Therefore, the intermediate server logic must build the responses for each bundled sequential write. The saved RPC request buffers are used. In steps 152 and 154 the reply is built for each bundled write in which the file size and block size and attributes of each reply are modified to appear that the writes were processed individually. The mechanism for achieving this is preferably software as shown in the preferred embodiment in Table 4 below.

TABLE 4

```
Set STARTSIZE to starting size of file before bundling.
  - Get OFFSET and LENGTH of original write request.
  IF OFFSET + LENGTH > STARTSIZE
     STARTSIZE = OFFSET + LENGTH
  - Update file size and number of blocks in attributes part of reply using STARTSIZE.
  FOR each bundled request (AMT_BUNDLED)
    - Get OFFSET and LENGTH of write request
    - copy reply information to request buffer
    - IF OFFSET+LENGTH > STARTSIZE
       STARTSIZE = OFFSET+LENGTH
    - Update file size and number of blocks in reply attributes using STARTSIZE
END
```

The variable STARTSIZE is set to the starting file size before the bundled write is sent. This is done so that a new file size can be calculated as each reply is processed. This STARTSIZE is not normally sent in the attributes of a write reply in the prior art. The remote server memory 31 is modified to include it in an unused field of the attributes. The file size must be adjusted in each write reply that is processed. The offset and length of the original write request are obtained and if the offset plus length is greater than the STARTSIZE, then STARTSIZE is reinitialized to OFFSET+LENGTH. Then the file size attribute and number of blocks are updated using STARTSIZE. Therefore, for each bundled request, i.e. AMT_BUNDLED, the following actions occur. The offset and length of the write request are obtained. The reply information (message ID, write status, file attributes) is copied to the request buffer, and if the OFFSET+LENGTH is greater than STARTSIZE then STARTSIZE is set equal to OFFSET+LENGTH. The attributes are then modified. The process ends when all bundled requests have been processed.

Referring again to FIG. 12, the first reply is sent to the client and then replies are sent for each bundled write request. Thus, in step 156 the initial write reply is sent to the client and in step 158 a reply is sent for each of the requests corresponding to the original requests that were bundled. After step 158 is complete processing of the write reply ends in step 160.

Figure 13:
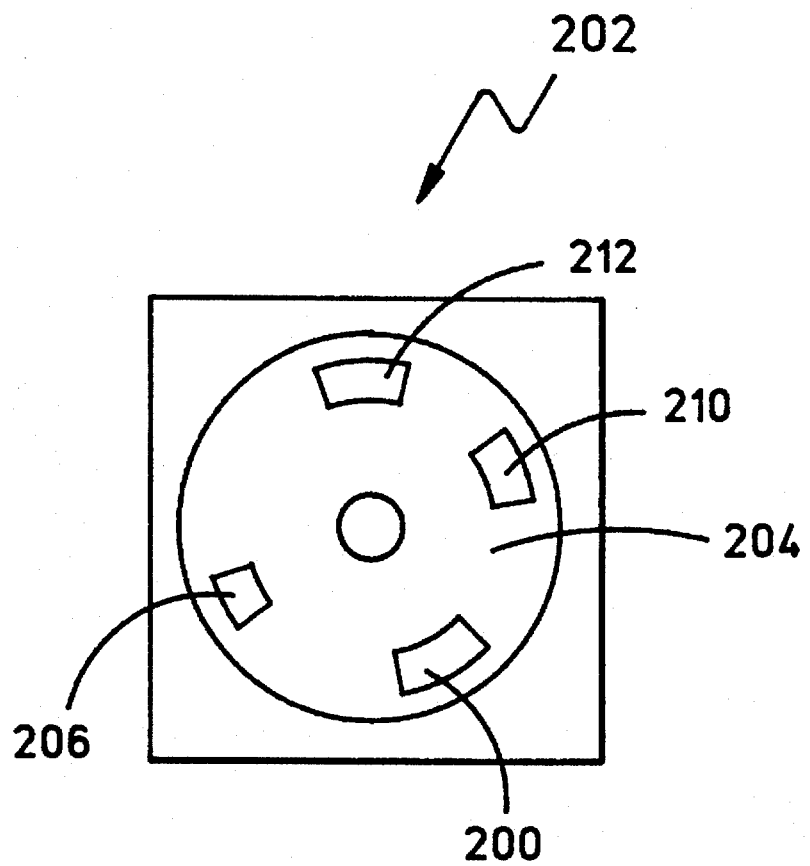
FIG. 13 is an article of manufacture or a computer program product including a storage medium for storing thereon program needs for carrying out the method of this invention in the data processing system of FIG. 1.

While this invention is primarily discussed as a method, it can be understood by a person of ordinary skill in the art that the apparatus discussed above in connection with FIGS. 1, 2 and 3 may be programmed or otherwise designed to facilitate the practice of the method of this invention. Also an article of manufacture, such as a prerecorded floppy disk 202 in FIG. 13, or other similar computer program product, For use with a data processing system such as the system depicted in FIG. 1, could include a storage medium, such as a magnetic storage medium 204 and program means recorded thereon, such as program means 206, 200, 210 and 212, that can be read and interpreted by the data processing system for directing the data processing system of FIG. 2 to facilitate the practice of the method of this invention. It should be understood that such apparatus and articles of manufacture also fall within the spirit and scope of this invention, Other embodiments and modifications of this invention may occur to those of ordinary skill in the art in view of these teachings. Therefore, this invention is to be limited only by the following claims, which include all such embodiments and modifications when viewed in conjunction with the above specification and accompanying drawing.

What is claimed is:

1. In a computerized data processing system including a client system, a server system in communication with the client system, the server system further including an intermediate server and a remote server having a data store, the intermediate server having main memory adapted to store a plurality of pending client write requests in a queue, and logic coupled to the remote server for managing access to the data store, a method for communicating client write requests to write data to the data store comprising the machine-executed steps of:

responsive to receiving a current client write request, referencing a predetermined data characteristic criterion defining a relationship between data specified by the current write request and data specified by a client write request received before the current write request to determine if the data characteristic criterion is met;

waiting an amount of time for additional client write requests to be received and placed in the queue, wherein the amount of time is determined according to whether the predetermined data characteristic criterion is met;

determining if any additional client write requests received during the waiting step are contiguous to the current write request;

bundling together an amount of client write requests that have been received in the queue with the current write request, wherein the amount bundled is determined according to whether a predetermined capacity of client write requests that are contiguous to the current write request have been placed in the queue;

sending the bundled client write requests to be committed to the data store; and sending a separate reply to the client for each write request included in the bundled write request.

2. The method of claim 1, and further comprising the steps of:

determining a quantity of client write requests that are pending for the client in the queue;

creating a pending client write requests count value representing the quantity of client write requests pending for the client in the queue; and referencing a predetermined threshold criterion defining a relationship between the pending client write requests count value to a predetermined threshold value to determine if the predetermined threshold criterion is met, wherein the time for waiting is additionally determined according to whether the predetermined threshold criterion is met.

3. The method of claim 2, wherein the amount of time waiting for additional client write requests is equal to a predetermined time increment that is greater than zero seconds if the predetermined data characteristic criterion is met and the predetermined threshold criterion is met.

4. The method of claim 2, wherein the amount of time waiting for additional client write requests is equal to zero seconds if the predetermined data characteristic criterion is not met.

5. The method of claim 2, wherein the amount of time waiting for additional write requests is equal to zero seconds if the predetermined threshold criterion is not met.

6. The method of claim 2, wherein the predetermined threshold criterion is met if the number of client write requests in the queue is less than the predetermined threshold value.

7. The method of claim 1, wherein the predetermined data characteristic criterion is met if the location of the data specified by the current client write request is contiguous to the location of the data specified by the client write request received before the current write request.

8. The method of claim 1, wherein the predetermined data characteristic criterion is met if the length of the data specified by the current client write request is the same as the length of the data specified by the client write request received before the current write request.

9. The method of claim 1, wherein the amount of client write requests bundled is equal to only one if no contiguous client write requests are placed in the queue and thereby only the current write request is included in the bundle.

10. The method of claim 1, and further comprising the step of determining if any client write request in the queue that is contiguous to the current write request has a lower sequential offset than the current write request, and then based on this sequential determination, ordering the client write requests in the bundle in sequential order with the write request having the lowest sequential offset being ordered as the first write request in the bundle.

11. The method of claim 1, wherein the reply includes a status field indicating if the bundled write was successful.

12. The method of claim 2, and further comprising the step of determining if any client write request in the queue that is contiguous to the current write request has a lower sequential offset than the current write request, and then based on this sequential determination, ordering the client write requests in the bundle in sequential order with the write request having the lowest sequential offset being ordered as the first write request in the bundle.

13. The method of claim 12, wherein the predetermined threshold criterion is met if the number of client write requests in the queue is less than the predetermined threshold value.

14. A server system in communication with a client system for communicating client write requests to write data to a data store on a server, the system comprising:

an intermediate server having a processor and main memory coupled to the processor and the main memory being adapted to store a plurality of client write requests in a queue;

a remote server having a data store;

the intermediate server further including logic in communication with the remote server for managing access to the data store; and the logic including machine-executed means coupled to the processor for communicating client write requests to write data to the data store by:

being responsive to receiving a current client write request by referencing a predetermined data characteristic criterion defining a relationship between data specified by the current write request and data specified by a client write request received before the current write request to determine if the data characteristic criterion is met;

waiting an amount of time for additional client write requests to be received and placed in the queue, wherein the amount of time is determined according to whether the predetermined data characteristic criterion is met;

determining if any additional client write requests received during the waiting step are contiguous to the current write request;

bundling together an amount of client write requests that have been received in the queue with the current write request, wherein the amount bundled is determined according to whether a predetermined capacity of client write requests that are contiguous to the current write request have been placed in the queue;

sending the bundled client write requests to be committed to the data store; and sending a separate reply to the client for each write request included in the bundled write request.

15. The system of claim 14, wherein the machine-executed means further includes means for communicating client write requests to write data to the data store by:

determining a quantity of client write requests that are pending for the client in the queue;

creating a pending client write requests count value representing the quantity of client write requests pending for the client that are pending for the client in the queue; and referencing a predetermined threshold criterion defining a relationship between the pending client write requests count value to a predetermined threshold value to determine if the predetermined threshold criterion is met, wherein the time for waiting is additionally determined according to whether the predetermined threshold criterion is met.

16. The system of claim 15, wherein the amount of time waiting for additional client write requests is equal to a predetermined time increment that is greater than zero seconds if the predetermined data characteristic criterion is met and the predetermined threshold criterion is met.

17. The system of claim 15, wherein the amount of time waiting for additional client write requests is equal to zero seconds if the predetermined data characteristic criterion is not met.

18. The system of claim 15, wherein the amount of time waiting for additional client write requests is equal to zero seconds if the predetermined threshold criterion is not met.

19. The system of claim 15, wherein the predetermined threshold criterion is met if the number of client write requests in the queue is less than the predetermined threshold value.

20. The system of claim 14, wherein the predetermined data characteristic criterion is met if the location of the data specified by the current client write request is contiguous to the location of the data specified by the client write request received before the current write request.

21. The system of claim 14, wherein the predetermined data characteristic criterion is met if the length of the data specified by the current client write request is the same as the length of the data specified by the client write request received before the current write request.

22. The system of claim 14, wherein the amount of client write requests bundled is equal to only one if no contiguous client write requests are placed in the queue and thereby only the current write request is included in the bundle.

23. The system of claim 14, and further including machine-executed means for determining if any client write request in the queue that is contiguous to the current write request has a lower sequential offset than the current write request, and then based on this sequential determination, ordering the client write requests in the bundle in sequential order with the write request having the lowest sequential offset being ordered as the first write request in the bundle.

24. A computer program product for communicating client write requests to write data to a data store on a remote server in a server system, the server system including an intermediate server having a processor and main memory coupled to the processor, the main memory being adapted to store a plurality of client write requests in a queue, the computer program product comprising:

a recording medium;

means, recorded on the recording medium, for being responsive to receiving a current client write request by referencing a predetermined data characteristic criterion defining a relationship between data specified by the current write request and data specified by a client write request received before the current write request to determine if the data characteristic criterion is met;

means, recorded on the recording medium, for directing the processor to wait an amount of time for additional client write requests to be received and placed in the queue, wherein the amount of time is determined according to whether the predetermined data characteristic criterion is met;

means recorded on the recording medium, for directing the processor to determine if any additional client write requests received during the waiting step are contiguous to the current write request;

means recorded on the recording medium, for directing the processor to bundle together an amount of client write requests that have been received in the queue with the current write request, wherein the amount bundled is determined according to whether a predetermined capacity of client write requests that are contiguous to the current write request have been placed in the queue:

means, recorded on the recording medium, for directing the processor to send the bundled client write requests to be committed to the data store; and memos recorded on the recording medium, for directing the processor to send a separate reply to the client for each write request included in the bundled write request.

25. The computer program product of claim 24, and further including:

means, recorded on the recording medium, for determining a quantity of client write requests that are pending for the client in the queue;

means recorded on the recording medium, for creating a pending client write requests count value representing the quantity of client write requests pending for the client in the queue: and means recorded on the recording medium, for referencing a predetermined threshold criterion defining a relationship between the pending client write requests count value to a predetermined threshold value to direct the processor to determine if the predetermined threshold criterion is met, wherein the time for waiting is additionally determined according to whether the predetermined threshold criterion is met.

26. The computer program product of claim 25, wherein the amount of time waiting for additional client write requests is equal to a predetermined time increment that is greater than zero seconds if the predetermined data characteristic criterion is met and the predetermined threshold criterion is met.

27. The computer program product of claim 25, wherein the amount of time waiting for additional client write requests is equal to zero seconds if the predetermined data characteristic criterion is not met.

28. The computer program product of claim 25, wherein the amount of time waiting for additional client write requests is equal to zero seconds if the predetermined threshold criterion is not met.

29. The computer program product of claim 25, wherein the predetermined threshold criterion is met if the number of client write requests in the queue is less than the predetermined threshold value.

30. The computer program product of claim 24, wherein the predetermined data characteristic criterion is met if the location of the data specified by the current client write request is contiguous to the location of the data specified by the client write request received before the current write request.

31. The computer program product of claim 24, wherein the predetermined data characteristic criterion is met if the length of the data specified by the current client write request is the same as the length of the data specified by the client write request received before the current write request.

32. The computer program product of claim 24, wherein the amount of client write requests bundled is equal to only one if the predetermined data criterion is not met by any client write requests placed in the queue and thereby only the current write request is included in the bundle.

33. An apparatus for communicating client write requests to write data to a data store on a remote server, the apparatus comprising:

a processor:

main memory coupled to the processor, wherein the main memory is adapted to store client write requests in a queue:

logic loaded into the main memory for managing access to the data store; and the logic including:

a write request module that is adapted to be responsive to a request from the client to write data on the data store, by:

referencing a predetermined data characteristic criterion defining a relationship between data specified by the current write request and data specified by a client write request received before the current write request to determine if the data characteristic criterion is met;

waiting an amount of time for additional client write requests to be received and placed in the queue, wherein the amount of time is determined according to whether the predetermined data characteristic criterion is met;

determining if any additional client write requests received during the waiting step satisfy the predetermined data criterion;

bundling together an amount of client write requests that have been received in the queue with the current write request, wherein the amount bundled is determined according to whether a predetermined capacity of client write requests that are contiguous to the current write request have been placed the queue; and sending the bundled client write requests to be committed to the data store; and a write reply module that is adapted to be responsive to sending the bundled client write requests to be committed to the data store by sending a separate reply to the client for each write request included in the bundled write request.

34. The apparatus of claim 33, wherein the write bundle module further comprises means for determining if any client write request in the queue that is contiguous to the current write request has a lower sequential offset than the current write request, and then based on this sequential determination, ordering the client write requests in the bundle in sequential order with the write request having the lowest sequential offset being ordered as the first write request in the bundle.

* * * * *

UNITED STATES PATENT AND TRADEMARK OFFICE
CERTIFICATE OF CORRECTION

PATENT NO. : 5,613,155
DATED : 3/18/97
INVENTOR(S) : Baldiga et al

It is certified that error appears in the above-indentified patent and that said Letters Patent is hereby corrected as shown below:

Col. 18, line 15 - "memos" should be --means,--;

Col. 19, line 10 - "queue:" should be --queue;--;

Col. 20, line 7 - "placed the queue" should be --placed in the queue--.

Signed and Sealed this

Eleventh Day of November, 1997

*Attest:*

BRUCE LEHMAN

*Attesting Officer*     *Commissioner of Patents and Trademarks*